United States Patent
Foster et al.

(10) Patent No.: US 10,467,281 B2
(45) Date of Patent: Nov. 5, 2019

(54) RELATIVE ADDRESSING

(71) Applicant: APPLE INC., Cupertino, CA (US)

(72) Inventors: Christopher C. Foster, Cupertino, CA (US); Huy V. La, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 539 days.

(21) Appl. No.: 15/179,918

(22) Filed: Jun. 10, 2016

(65) Prior Publication Data

US 2017/0357652 A1    Dec. 14, 2017

(51) Int. Cl.
| | | |
|---|---|---|
| G06F 16/44 | (2019.01) | |
| G09G 5/30 | (2006.01) | |
| G06F 17/24 | (2006.01) | |
| G06F 16/29 | (2019.01) | |

(52) U.S. Cl.
CPC ............ *G06F 16/444* (2019.01); *G06F 16/29* (2019.01); *G06F 17/248* (2013.01); *G09G 5/30* (2013.01)

(58) Field of Classification Search
CPC .. G06F 16/29; G06F 16/24575; H04W 4/029; G01S 5/0027
See application file for complete search history.

(56) References Cited

U.S. PATENT DOCUMENTS

| | | | | |
|---|---|---|---|---|
| 2003/0182258 | A1* | 9/2003 | Sakamoto | ......... G06F 17/30696 |
| 2006/0235739 | A1* | 10/2006 | Levis | ..................... G06Q 10/08 |
| | | | | 705/1.1 |
| 2007/0250325 | A1* | 10/2007 | Currey | .................. G06Q 10/08 |
| | | | | 705/1.1 |
| 2008/0288462 | A1* | 11/2008 | Naono | .................. G06F 16/288 |
| 2013/0110822 | A1* | 5/2013 | Ikeda | .................. G06F 16/9535 |
| | | | | 707/722 |
| 2014/0317516 | A1* | 10/2014 | Doubleday | ............ G01C 21/32 |
| | | | | 715/738 |
| 2016/0321297 | A1* | 11/2016 | Jurca | ................. G06F 17/30241 |

* cited by examiner

*Primary Examiner* — Cheyne D Ly
(74) *Attorney, Agent, or Firm* — Invoke

(57) ABSTRACT

A processor may receive a request to display descriptive information for a location of interest on a device. The processor may retrieve a first set of attributes for the location of interest and compare the retrieved set of attributes to a second set of attributes for a location associated with the device. The processor may reduce the first set of attributes to a reduced set of attributes comprising attributes that are different from the attributes in the second set of attributes. The processor may cause the device to display the reduced set of attributes.

41 Claims, 16 Drawing Sheets

| Location 300 | |
|---|---|
| Suite 302 | 152 | Attribute 350 |
| Building 304 | 557 | Attribute 352 |
| Street 306 | University Ave | Attribute 354 |
| City 308 | East Palo Alto | Attribute 356 |
| County 310 | San Mateo | Attribute 358 |
| State 312 | California | Attribute 360 |
| Region 314 | Western | Attribute 362 |
| Country 316 | USA | Attribute 364 |
| Continent 318 | North America | Attribute 366 |
| Hemisphere 320 | Western | Attribute 368 |
| Planet 322 | Earth | Attribute 370 |

| Location 301 | | |
|---|---|---|
| Suite 302 | -- | Attribute 351 |
| Building 304 | 124 | Attribute 353 |
| Street 306 | Page Mill Rd. | Attribute 355 |
| City 308 | Palo Alto | Attribute 357 |
| County 310 | San Mateo | Attribute 358 |
| State 312 | California | Attribute 360 |
| Region 314 | Western | Attribute 362 |
| Country 316 | USA | Attribute 364 |
| Continent 318 | North America | Attribute 366 |
| Hemisphere 320 | Western | Attribute 368 |
| Planet 322 | Earth | Attribute 370 |

FIG. 3A

| Canton 380 |   |
|---|---|
| Attribute 390 |   |
| ID 392 | 152 |
| Location 394 | Long, lat |
| Geofence 396 |   |
| Type 398 | City |

| Guangzhou 382 |   |
|---|---|
| Attribute 390 |   |
| ID 392 | 152 |
| Location 394 | Long, lat |
| Geofence 396 |   |
| Type 398 | City |

FIG. 3B

RELATIVE ADDRESSING

TECHNICAL FIELD

The disclosure generally relates to displaying address information for a location with a device.

BACKGROUND

Computing devices such as personal computers, smart phones, tablets, and other devices may display address information for locations of interest. For example, a user may search for a location or information related to a location (e.g., a search for a business that has a physical location), or a user may view a map and select points of interest labeled thereon. In response, the device may display address information for the subject of the search or selected map item.

SUMMARY

In some embodiments, computing devices may be configured to display descriptive information for a location of interest. Devices may select the information to display based on a comparison of attributes for the location of interest and attributes for the location of the device itself or some other first location associated with the device. For example, a device may receive a request to display descriptive information for a location of interest on a device. The device may retrieve a first set of attributes for the location of interest and compare the retrieved set of attributes to a second set of attributes for a location associated with the device. The device may reduce the first set of attributes to a reduced set of attributes that are different from the attributes in the second set of attributes. The device may display the reduced set of attributes. In some embodiments, a server in communication with the device may perform the attribute retrieval, comparison, and reduction actions and send the result to the device.

Particular implementations provide at least the following advantages: A device may display less than a full set of address information for a location of interest when the device is in a location having one or more similar attributes to those of the location of interest (e.g., same city, same state, same country, etc.). This may reduce the amount of data required to display address information, thereby allowing more additional information to be displayed and/or reducing processor load for display control. In embodiments wherein a server transmits information for display over a network to the display device, this may also reduce network traffic volume and bandwidth requirements. Furthermore, a user may receive the most relevant and useful information in response to a query, enhancing a user experience.

Details of one or more implementations are set forth in the accompanying drawings and the description below. Other features, aspects, and potential advantages will be apparent from the description and drawings, and from the claims.

DESCRIPTION OF DRAWINGS

FIG. 3A shows examples of location attributes.

FIG. 3B shows an example using attributes to correlate different descriptions for a single location.

Like reference symbols in the various drawings indicate like elements.

DETAILED DESCRIPTION

Relative Addressing

Systems and methods described herein may provide relative addressing, which may include determining which address details may be likely to be relevant to a user and which address details may be likely to be less relevant, based on a comparison of address attributes with device location attributes. A device may use relative addressing to format displayed information for a location based on a relationship between that location and a first location or a device's current location. For example, relative addressing may provide a user less information about local, proximate, and/or familiar locations than remote, distant, and/or unfamiliar locations. Furthermore, this information may be formatted according to local conventions.

A device may also use relative addressing to evaluate relationships between addresses based on attributes that may be separate from commonly used and/or official address names and conventions, which may allow comparisons even when discrepancies in address information arise (e.g., misspellings of search queries, alternate location names in common use, etc.).

FIGS. 1A-2C show several example use cases wherein relative addressing may select specific portions of a total set of address data for display. Many other use cases for relative addressing may be possible, but these examples are presented to illustrate how relative addressing may vary the information being displayed on a device.

Figure 1A:
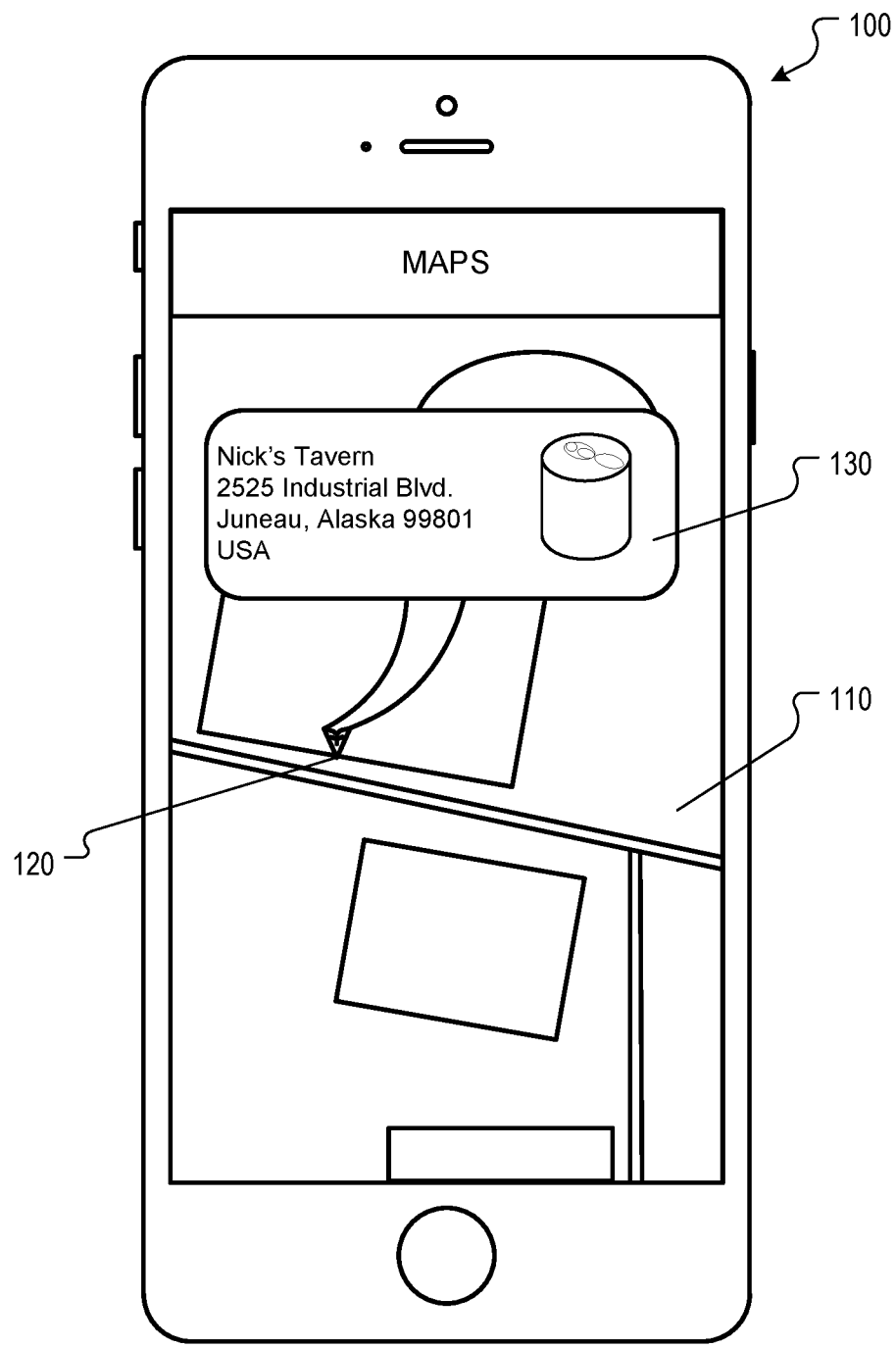
FIGS. 1A-1D are example devices displaying address information on a map.

FIG. 1A shows a computing device 100, in this example, a smartphone. A computing device may be one of a variety of electronic devices including, but not limited to, laptop computers, desktop computers, computer terminals, television systems, tablet computers, e-book readers, smart phones, watches, and wearable computers. Device 100 may be configured to determine its own location, for example using GPS or other global positioning technology, using information received from a cellular or other network, or the like.

Device 100 may be configured to run one or more applications, for example an application that displays a map 110. In FIG. 1A, device 100 user may have selected a target location 120 on map 110 or performed a search causing location 120 to be selected. For example, the user may have clicked on an icon indicating the presence of a bar while browsing map 110, or the user may have searched for bars in Juneau, Ak. and selected Nick's Tavern from a list of results, or the user may have searched for the specific address or a portion thereof (e.g., "2525 Industrial Ave."), or performed some other action causing the display of information describing Nick's Tavern.

Device 100 may display location information 130 for target location 120. The specific location information 130 displayed may depend on a comparison between attributes describing device 100 location or other first location (e.g., a user profile home location, a specified starting location for directions to target location 120, etc.) and target location 120. For example, in FIG. 1A, device 100 may be located outside the United States. Accordingly, device 100 street address, city, state or other region, zip code or other postal code, and country may all be different from target location 120 street address, city, state, zip code, and country. Accordingly, location information 130 may include not only the name of Nick's Tavern, but also other pieces of information where there is a discrepancy between device 100 location and target location 120 (street address, city, state, zip code, and country). Each of these address elements may correspond to a single attribute, and the attributes, rather than the actual address elements themselves, may be compared to decide which to show and which to omit.

Figure 1B:
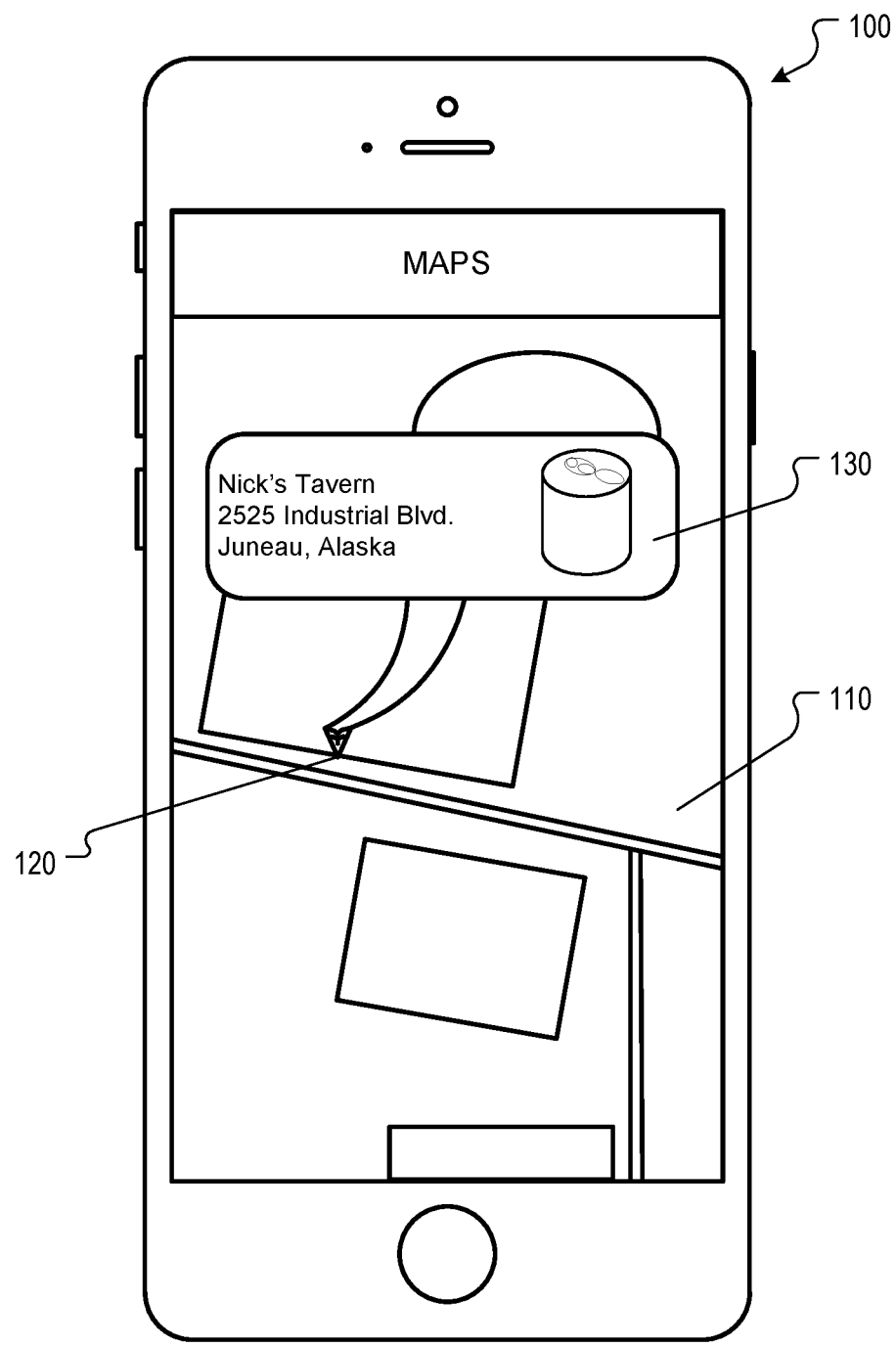

FIG. 1B is an example using the same target location 120 wherein device 100 is located in the United States, but not in Alaska. Because the attribute corresponding to country of device 100 and target location 120 is the same, country is not displayed in location information 130, only name, street address, city, and state. In FIG. 1B, zip code is also omitted even though device 100 zip code and target location 120 zip code are different. In this example, a template applicable to target location 120 may specify further removal of information that may be considered less relevant to conventional use in a region of the target location 120. For example, in the United States, zip code may be less frequently used for navigation. In conventional use, a description of how to find a place may include street address, city, and state but may omit zip code. The template may require information linked to a zip code attribute to be omitted. Note that other information, such as county, is also omitted as being less important in the United States according to a template. In contrast, a target location in the United Kingdom may include county but may omit city if the template for the United Kingdom specifies that county is important but city is not.

Figure 1C:
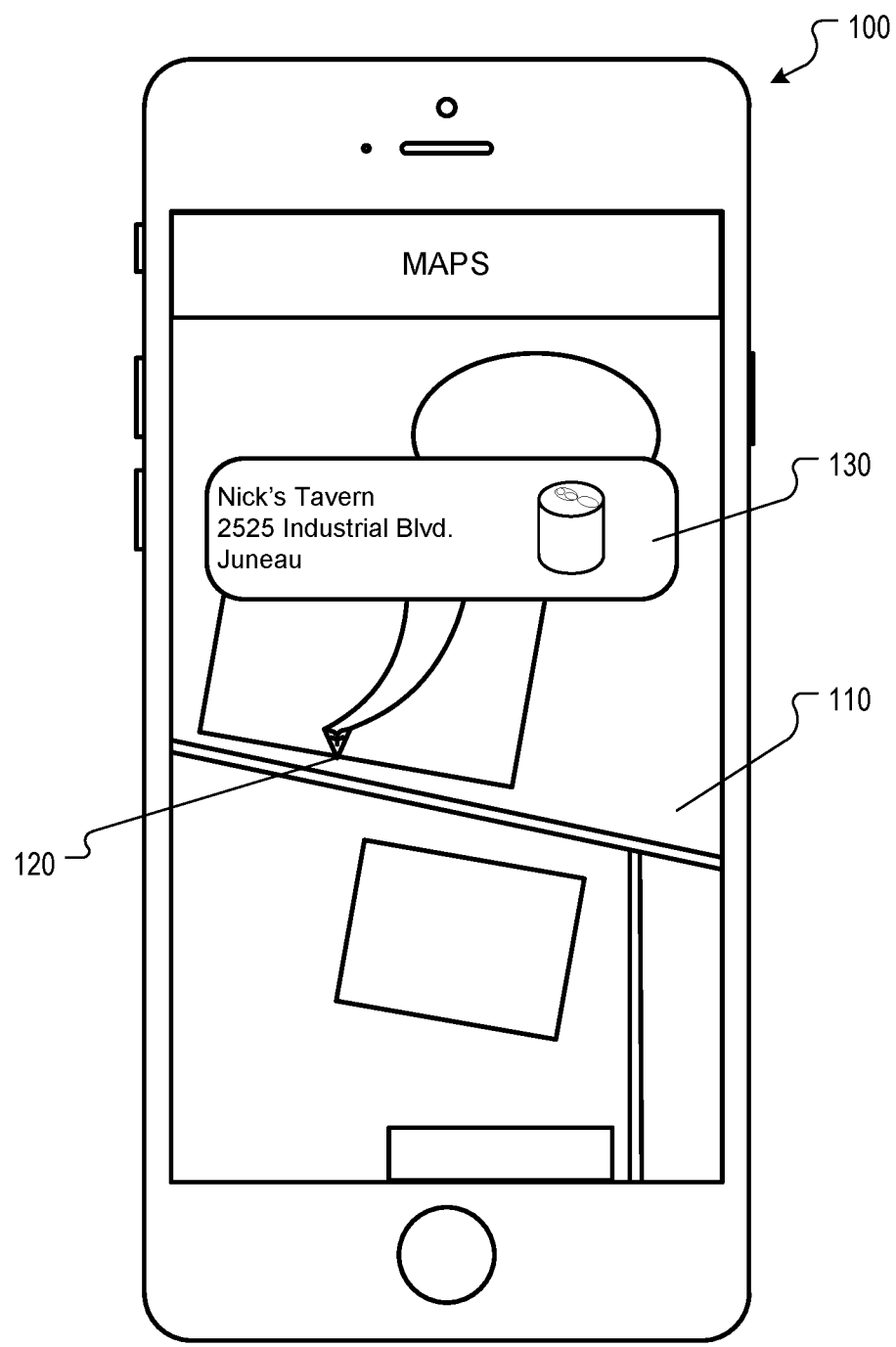

FIG. 1C is an example using the same target location 120, but now device 100 may be located in Alaska but not in Juneau. For example, a user in Sitka may have searched for bars in Juneau. Now, location information 130 may omit Alaska, because device 100 and target location 120 have the same state level attribute. This figure also illustrates an outcome when the first location is an auto complete base location in some embodiments. For example, if a user searches for a location using a search term (e.g., "bars in Alaska") that yields "Nick's Tavern" in Alaska as a result, and all the other results are also in Alaska, the state level information may be omitted from the displayed results. The first location used for the comparison may be Alaska, because all results are in Alaska. The same processing may be applied to other location levels in other embodiments (e.g., all search results are in the same city, so city is used as the first location).

Figure 1D:
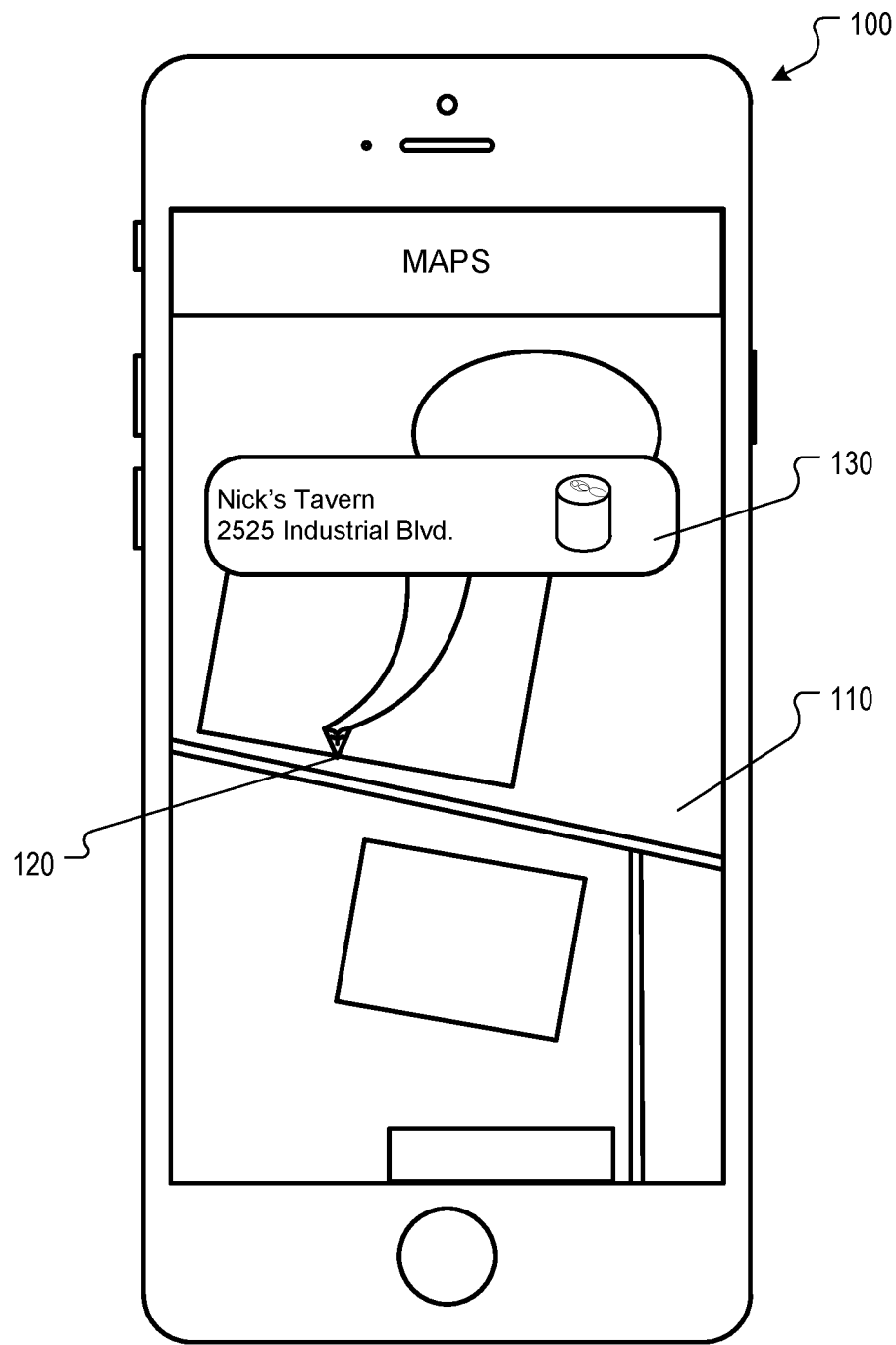

FIG. 1D is another example using the same target location 120, but now device 100 and target location may both be located in Juneau, Ak. Now, location information 130 may omit Juneau and Alaska, because device 100 and target location 120 have the same city and state level attributes.

Figure 1E:
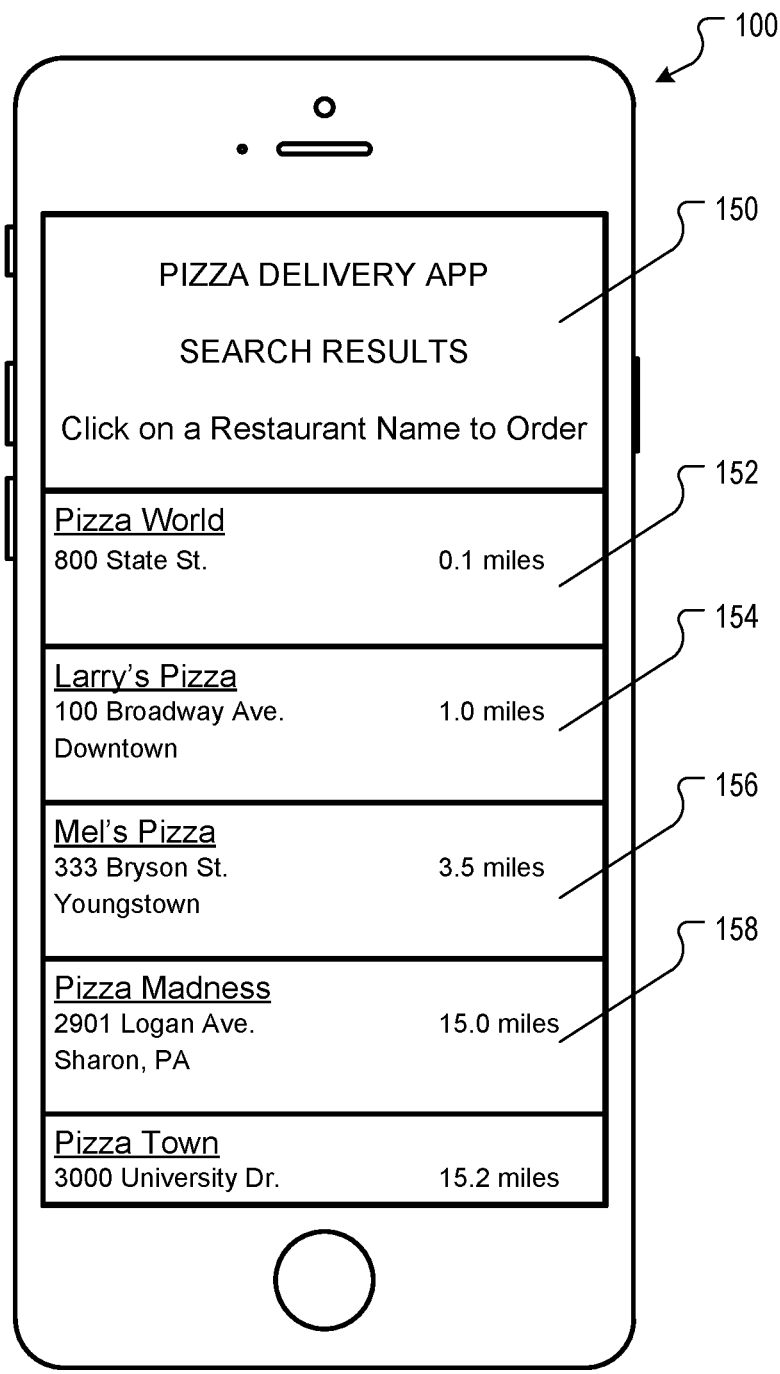
FIG. 1E is an example device displaying address information in search results.

FIG. 1E is an example wherein device 100 is running a different application (e.g., a food delivery app 150) that may use location information. A user of device 100 located in Girard, Ohio may have searched for pizza. App 150 may present several search results 152-158 arranged by distance from device 100. Nearest result 152 may be in the same city, so app 150 may show only the location name and street address. Next result 154 may be in the same city but a different neighborhood, and a template for Girard, Ohio may indicate that neighborhood-level attributes are important. Accordingly, app 150 may show name, street address, and neighborhood for this result 154. Next result 156 may be in another city (Youngstown), but the same state. Thus, app 150 may show name, street address, and city for this result 156. Finally, last visible result 158 may be in another state (Pennsylvania). App 150 may show name, street address, city, and state for this result 158.

Figure 2A:
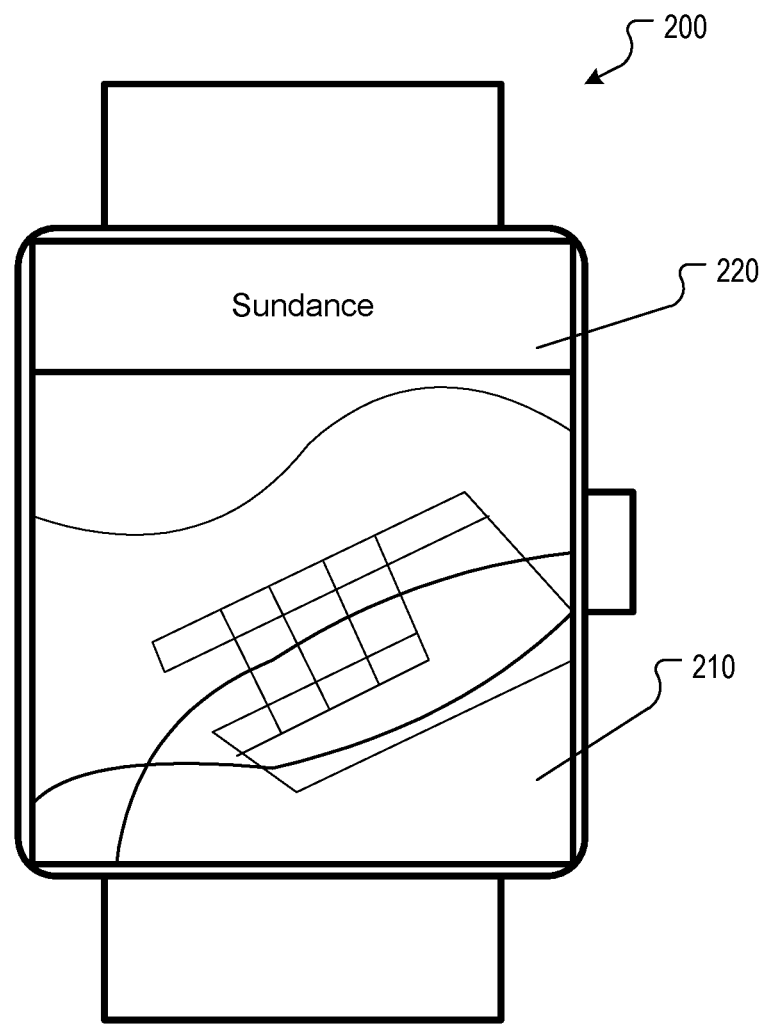
FIGS. 2A-2C are example devices displaying maps with descriptive information.

FIG. 2A shows a computing device 200, in this example, a smartwatch. Device 200 may run an app displaying a map 210 and title 220, wherein title 220 describes the area shown on map 210. Title 220 may be determined using an attribute that most accurately describes the visible area. Device 200 may compare geofence attributes in the visible area to an attribute defining the visible area (e.g., a geofence drawn at the boundaries of the visible area), wherein the attribute defining the visible area is a location associated with device 200 by virtue of it being displayed by device 200. For example, in FIG. 2A, a geofence attribute defining the area of the city of Sundance, Wyo. may be the only geofence or the largest geofence fully contained within the displayed area of map 210. An attribute defining the displayed map 210 area may be compared to the geofence attribute to select the title. Title 220 may display "Sundance" and may omit other information that may also apply to the map but may not represent the most accurate description of what is shown. For example, title 220 may omit "Wyoming" because only a small portion of Wyoming is visible on map 210.

Figure 2B:
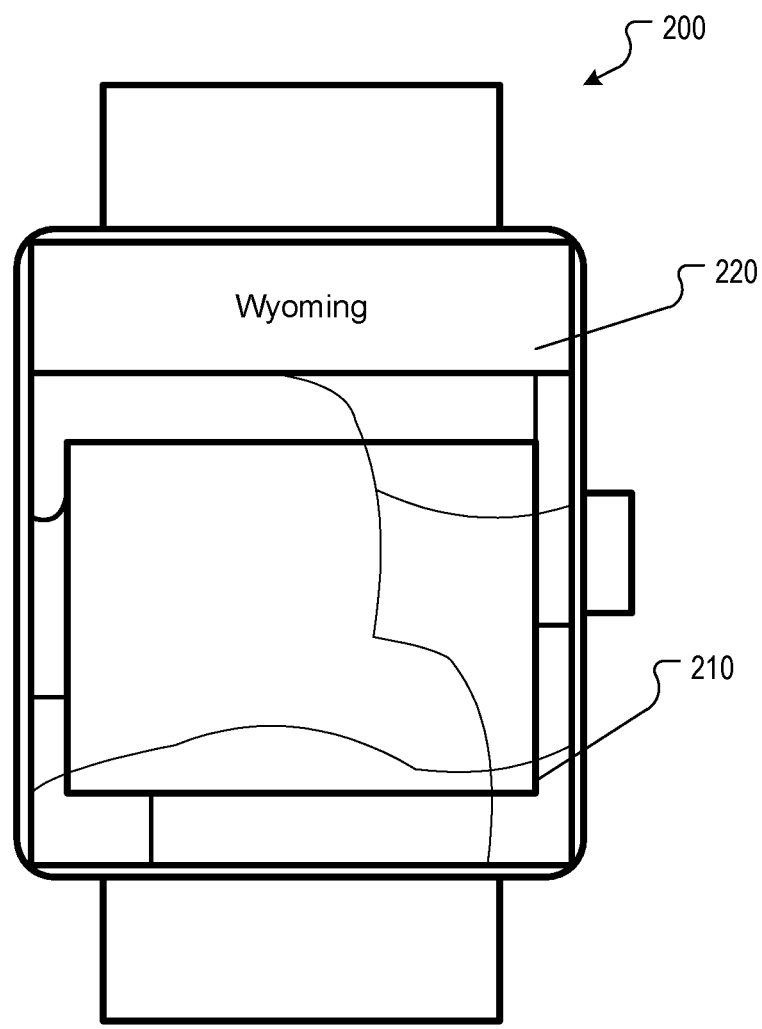

In FIG. 2B, a user may have zoomed the map 210 out, so that now the largest visible geofence-defined area is Wyoming. Title 220 may display "Wyoming." Even though Sundance is fully contained within the visible area of map 210, Sundance's geofence attribute may be smaller than Wyoming's geofence attribute, so Wyoming may be selected over Sundance.

Figure 2C:
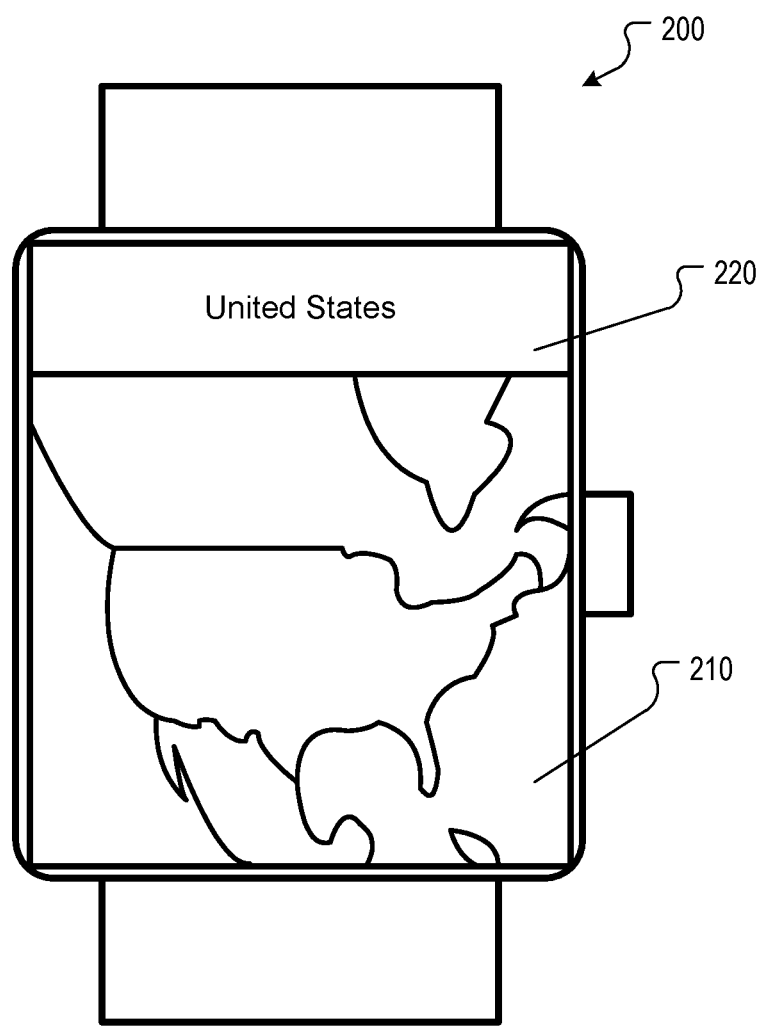

In FIG. 2C, a user may have zoomed out further so that now the United States may have the largest geofence attribute on the map 210, and title 220 may display "United States."

Attributes

FIG. 3A shows examples of location 300 and 301 names and attributes. Each location 300/301 may be described by a series of names. For example, names may include suite number 302, building number 304, street name 306, city name 308, county name 310, state name 312, region name 314, country name 316, continent name 318, hemisphere name 320, and/or planet name 322. Other names may be possible, and not all locations may have all names. For example, location 301 has no suite number 302.

Each name may be associated with an attribute, which may be a generic identified for the name. An attribute may be generic in that any variation of a name may be associated with the same attribute. For example, attribute 364 may be used for each of United States, United States of America, US, USA, États-Unis, and Estados Unidos (among others). The different names for the United States may correspond to the same country code (e.g., a number 364). Each attribute level (e.g., country, city, state, etc.) may have a corresponding code (e.g., country code, city code, etc.). Different city names mapped to the same city code may refer to the same city (e.g., New York, New York City, N.Y.C, and The Big Apple may all be mapped to the same number; and Cork, County Cork, Contae Chorcai, and Cork County may all be mapped to the same number). In some embodiments, a null attribute (e.g., attribute 351) may be present in the attribute data set to indicate that a location 301 does not have a certain category of name 302, and in other embodiments, locations 301 without certain categories of names may simply have no attribute for that category.

In the example of FIG. 3A, first location 300 and second location 301 share some attributes and have some attributes that are different. For example, first location has attributes 350, 352, 354, and 356 for its suite, building, street, and city, respectively, while second location has attributes 351, 353, 355, and 357 for the same respective categories. Other attributes (e.g., from the county level upward in political scale) are the same for both locations 300/301.

In a situation where device 100 is at first location 300 and a user has requested information about second location 301, device may display "124 Page Mill Rd., Palo Alto," omitting name information associated with the attributes first location 300 and second location 301 have in common.

FIG. 3B shows an example of how different names may be mapped to the same attribute to account for discrepancies in spelling and usage. As noted above, United States and its various alternate forms may all be lined to the same attribute. In the example of FIG. 3B, two different names for the same city (Canton 380 and Guangzhou 382) are shown. Although the names are different, they may be linked to the same generic attribute 390 (e.g., by mapping the different city names to the same city code).

FIG. 3B also shows attribute 390 details which may be used for determining whether a template applies to the attribute 390 and/or for comparing the attribute 390 with other attributes. For example, attribute 390 may be associated with an identifier 392, location (e.g., latitude and longitude coordinates) 394, geofence (e.g., defining an area of the location) 396, and type (e.g., city, state, road, etc.) 398.

Every known name for a location may be associated with the same attribute and may therefore be defined by the same details. For example, when determining whether two map labels (e.g., city names) correspond to the same location, device 100 may compare identifiers 392, locations 394, geofences 396, types 398, etc. to determine whether different the address labels correspond to the same location. Attributes and associated details may be stored in device 100 memory and/or may be accessible by device 100 at a remote storage location (e.g., a server).

Example Processes

Figure 4:
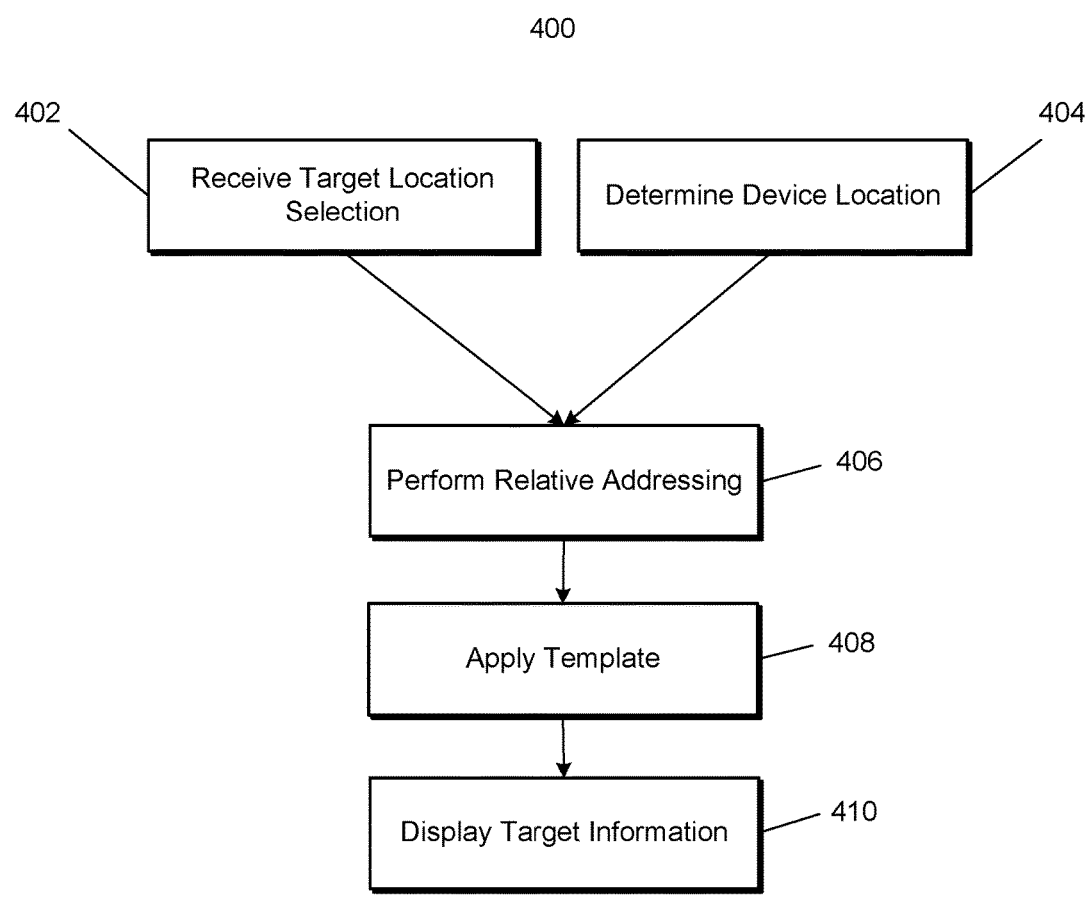
FIG. 4 is a flow diagram of an example process for displaying location information.

FIG. 4 is a flow diagram of an example process 400 for displaying location information. This process 400 may generate context specific location information and may be performed by device 100 in response to receiving a command to display location information.

In step 402, device 100 may receive a target location 120 selection. For example, a user may search for a location or interact with a map as described above, such that a device 100 response to the user input may ultimately include displaying address data. Other commands to display target location 120 information (e.g., a location displayed on a website, in a calendar appointment or reminder, in a contact entry, or other commands) may also cause device 100 to display address data that may be processed to be context specific. Target location 120 may be associated with one or more attributes (e.g., address, city, state, country, latitude and longitude, presence within geofence, etc.).

In step 404, device 100 may determine its own location, for example using GPS or other global positioning technology, using information received from a cellular or other network, or the like. Device 100 location may include one or more attributes (e.g., address, city, state, country, latitude and longitude, presence within geofence, etc.).

In step 406, device 100 may compare target location 120 attributes and device 100 location attributes. When one or more target location 120 attributes match one or more device 100 location attributes, some or all of the data associated with matching attributes of target location 120 may be disregarded for display. For example, only non-matching attributes, or only non-matching attributes plus a lowest level matching attribute (e.g., if city and state both match, display city but not state), may be displayed.

If there are one or more templates that apply to an area in which the target location 120 is found, in step 408, device 100 may apply the templates to the non-matching attributes of target location 120. For example, if device 100 location and target location 120 are in different counties, but the template indicates that county is not to be displayed, data associated with the county level attribute of target location 120 may be omitted for display.

In step 410, device 100 may display location information for target location 120 that has been reduced through relative addressing (step 406) and template application (step 408). For example, as shown in FIGS. 1A-1E, location information may be displayed differently depending on the location of device 100 and template rules applicable to target location 120.

In some embodiments, process 400 may be performed at least in part by a remote server in communication with device 100. For example, server may receive target location selection (step 402) and device 100 location information (step 404) from device 100. Server may perform relative addressing (step 406) using the received information and/or apply any relevant templates (step 408). Server may send the resulting information to device 100, thereby causing device 100 to display the information (step 410).

Figure 5:
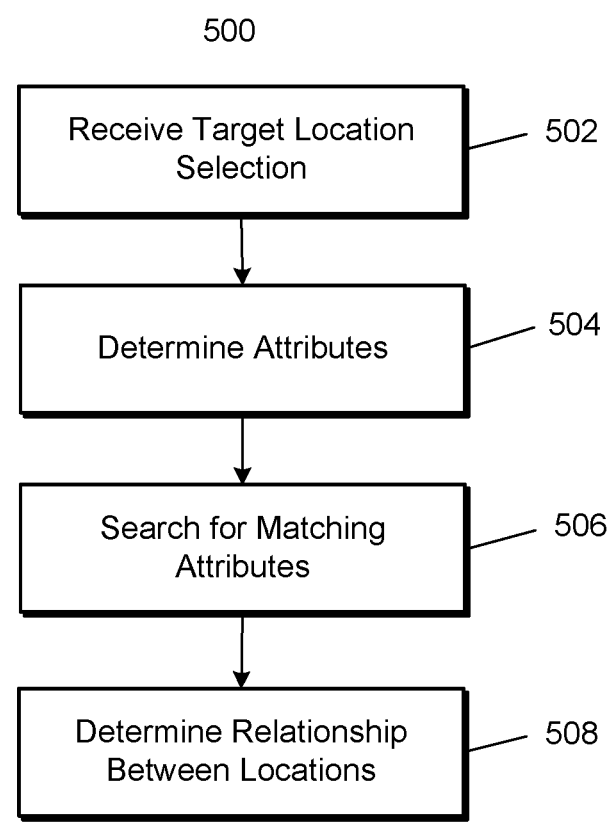
FIG. 5 is a flow diagram of an example process for correlating locations.

FIG. 5 is a flow diagram of an example process 500 for correlating locations. Relative addressing may be used not only for determining what location information is relevant enough to display, but also for correlating alternate names, spellings, and/or descriptions for locations.

In step 502, device 100 may receive a target location 120 selection. For example, a user may input a request for information about target location 120 (e.g., a search for "Guangzhou").

In step 504, device 100 may determine one or more attributes for target location 120 (e.g., type, latitude and longitude, presence within geofence, etc.). These attributes may be sent to device 100 from remote databases (e.g., map data servers or the like) and may be stored in device 100 local storage.

In step 506, device 100 may search one or more data sources for locations having most or all of the same attributes as target location 120. For example, device 100 may search a database of location information in local memory and/or may query remote databases.

In step 508, if device 100 finds any locations having at least some of the same attributes as target location 120, device 100 may analyze the found locations further to determine whether any of them describe the same location as target location 120. For example, when all attributes of a found location match those of target location 120, device 100 may determine that the found location is the database entry for target location 120.

In some implementations, when some number of attributes of the found location at or above some threshold level match those of target location 120, device 100 may determine that the found location entry represents the same location as target location 120. For example, as shown in FIG. 3B, Canton and Guangzhou may have non-matching names 380 and 382, but all other attributes 390-398 match. Accordingly, device 100 may determine that data relevant to Canton (e.g., a business address in Canton) may be relevant to a query for Guangzhou. This may allow device 100 to account for alternate names and/or misspellings in handling location queries.

Note that because abstract attributes (e.g., country codes, city codes, identifiers, geofences, etc.) are used for matching rather than actual names (e.g., map labels), similarly named locations may be disregarded in the correlation analysis of process 500. For example, Canton, Ohio, United States may not be correlated with Canton, Guangdong, China because the city names are associated with different attributes (e.g., different city codes).

In some embodiments, process 500 may be performed at least in part by a remote server in communication with device 100. For example, server may receive target location 120 selection (step 502) from device 100. Server may perform the subsequent processing of steps 504-508 and may return results to device 100.

Figure 6:
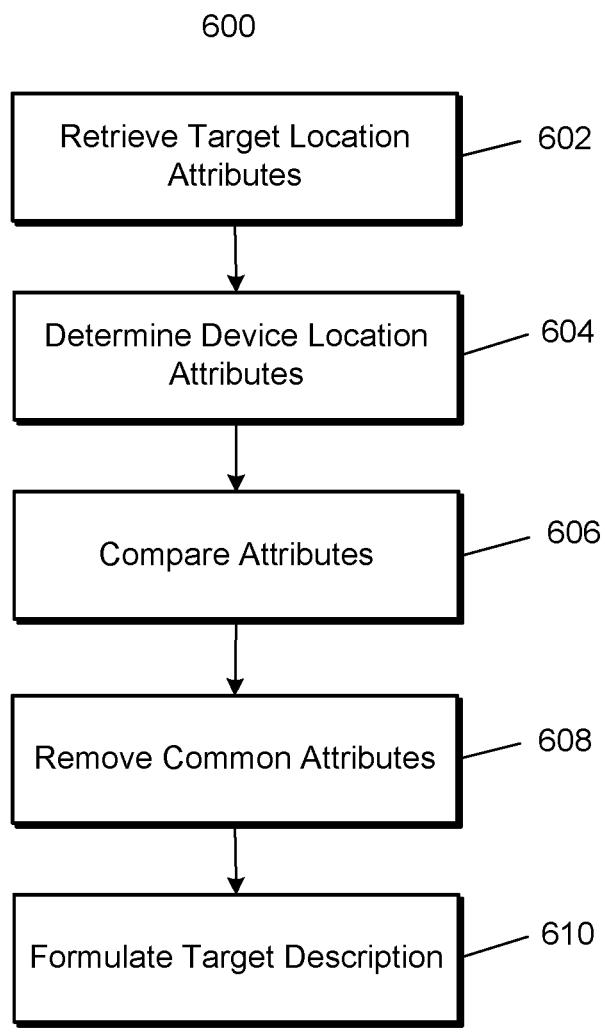
FIG. 6 is a flow diagram of an example process for determining relevant location information.

FIG. 6 is a flow diagram of an example process 600 for determining relevant location information. For example, device 100 may use process 600 to perform relative addressing (e.g., step 406 of process 400) when displaying target location 120 information. Device 100 may use process 600 for generating addresses for display, as shown in FIGS. 1A-1E, for example.

In step 602, device 100 may retrieve a set of attributes for target location 120. For example, device 100 may search a database of location information in local memory and/or may query remote databases.

In step 604, device 100 may determine device 100 location attributes. For example, device 100 may include a GPS transceiver configured to determine an approximate set of latitude and longitude coordinates for device 100. Device 100 may search a database of location information in local memory and/or may query remote databases for a set of attributes corresponding to the coordinates. For example, if device 100 is located at a same latitude and longitude as a particular street address in a particular city, device 100 may determine its location attributes to include attributes for that street address, city, and related elements (e.g., state, country, etc.). GPS is presented as an example location determination technology, but device 100 may determine its own location in other ways (e.g., cellular triangulation, lookup of address information associated with a user account active on the device, or the like).

In step 606, device 100 may compare attributes for target location 120 with device 100 location attributes.

In step 608, device 100 may drop attributes from target location 120 that match device 100 location attributes. For example, if device 100 and target location 120 are in the same country, based on having the same country level attribute, country may be disregarded.

In step 610, device 100 may formulate a target location 120 description using location information associated with attributes that remain after the filtering of step 608. For example, country may have been disregarded, but device 100 and target location 120 may have different city level attributes. Accordingly, device 100 may generate a target location 120 description including street address and city but omitting country.

In some embodiments, process 600 may be performed at least in part by a remote server in communication with device 100. For example, server may receive target location 120 selection and device location (step 604) from device 100. Server may retrieve target location 120 attributes (step 602) and perform the subsequent processing of steps 606-610 and may return results to device 100.

Figure 7:
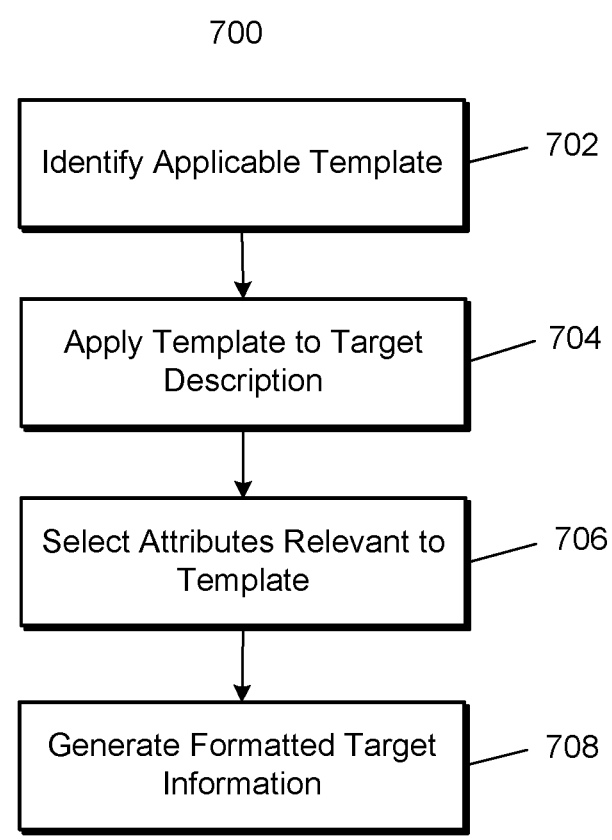
FIG. 7 is a flow diagram of an example process for determining area-specific relevant location information.

FIG. 7 is a flow diagram of an example process 700 for determining area-specific relevant location information. For example, device 100 may use process 700 to refine relative addressing results (e.g., step 408 of process 400) when displaying target location 120 information.

As described above, some locations may have templates further defining what attributes are relevant for display in addition to the attribute selection made through relative addressing. For example, in some cities, neighborhoods or suburbs may be relevant, and in other cites they may not. In some countries, state may be relevant and county may not, while in other countries county may be more relevant than city. In some areas, a location may be in one city and county for postal purposes and a different city and county for administrative purposes. Templates may define local and regional nuances such as these, allowing device 100 to display useful location information relevant to target location 120.

Device 100 may also select templates based on the context in which the location information is to be displayed. For example, if device 100 is running a weather app, and the user selects a location on a map to request weather information for that location, specific street address level information may be irrelevant to the user. Device 100 may use the context of the location being selected in a weather app to apply a template that restricts displayed location information to city and state and/or country, for example. A space limitation may provide another context restriction. For example, if an area for displaying location information is limited to a set number of characters, device 100 may apply a template to remove certain data according to a priority rank until the size restrictions are met.

In step 702, device 100 may identify an applicable template. In some embodiments, device may search a database of location information in local memory and/or may query remote databases to see if any templates apply to any attributes of target location 120. For example, if target location 120 has a country attribute value placing it in the United States, a template for the country attribute associated with the United States may be selected. In other cases, device 100 may select a template based on the context for location information display.

In step 704, device 100 may apply the selected template to target location 120 information. The template may filter names linked to attributes beyond those selected based on differences between device 100 location and target location 120. For example, the United States template may include a rule that specifies county-level attributes are not relevant, and therefore any county information is not to be displayed, even when the county-level attributes of device 100 location and target location 120 are different.

In step 706, device 100 may select the attributes that remain after filtering in step 704 as the attributes relevant to the template, and the names linked to the remaining attributes may be used as the location information for target location 120.

In step 708, device 100 may generate formatted target location 120 information, including names linked to the attributes in step 706. Device may display the formatted target location 120 information (e.g., in step 410 of FIG. 4).

In some embodiments, process 700 may be performed at least in part by a remote server in communication with device 100. For example, server may receive target location 120 information from device 100, perform the processing of steps 702-708, and return results to device 100.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 8:
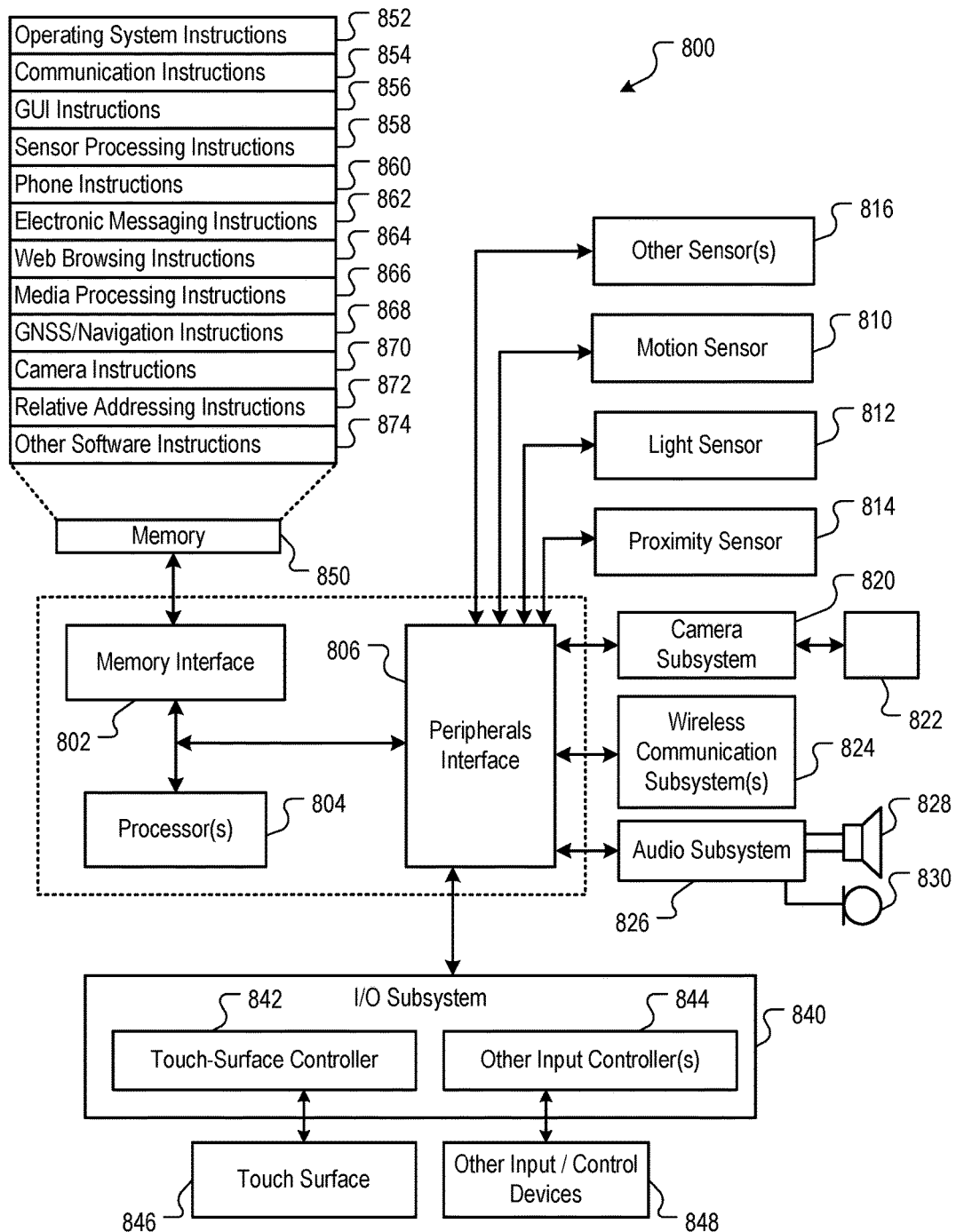
FIG. 8 is an example device configured for displaying relevant location information.

FIG. 8 is a block diagram of an example computing device 800 that may implement the features and processes of FIGS. 1A-7. For example, computing device 800 may determine and display location information and/or may receive location information from a server and display the received location information. The computing device 800 may include a memory interface 802, one or more data processors, image processors, and/or central processing units 804, and a peripherals interface 806. The memory interface 802, the one or more processors 804, and/or the peripherals interface 806 may be separate components or may be integrated in one or more integrated circuits. The various components in the computing device 800 may be coupled by one or more communication buses or signal lines.

Sensors, devices, and subsystems may be coupled to the peripherals interface 806 to facilitate multiple functionalities. For example, a motion sensor 810, a light sensor 812, and a proximity sensor 814 may be coupled to the peripherals interface 806 to facilitate orientation, lighting, and proximity functions. Other sensors 816 may also be connected to the peripherals interface 806, such as a global navigation satellite system (GNSS) (e.g., GPS receiver), a temperature sensor, a biometric sensor, magnetometer, or other sensing device, to facilitate related functionalities.

A camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. The camera subsystem 820 and the optical sensor 822 may be used to collect images of a user to be used during authentication of a user, e.g., by performing facial recognition analysis.

Communication functions may be facilitated through one or more wireless communication subsystems 824, which can include radio frequency receivers and transmitters and/or optical (e.g., infrared) receivers and transmitters. For example, the BTLE and/or WiFi communications described above may be handled by wireless communication subsystems 824. The specific design and implementation of the communication subsystems 824 may depend on the communication network(s) over which the computing device 800 is intended to operate. For example, the computing device 800 may include communication subsystems 824 designed to operate over a GSM network, a GPRS network, an EDGE network, a WiFi or WiMax network, and a Bluetooth™ network. For example, the wireless communication subsystems 824 may include hosting protocols such that the device 800 can be configured as a base station for other wireless devices and/or to provide a WiFi service.

An audio subsystem 826 may be coupled to a speaker 828 and a microphone 530 to facilitate voice-enabled functions, such as speaker recognition, voice replication, digital recording, and telephony functions. The audio subsystem 826 may be configured to facilitate processing voice commands, voiceprinting, and voice authentication, for example.

The I/O subsystem 840 may include a touch-surface controller 842 and/or other input controller(s) 844. The touch-surface controller 842 may be coupled to a touch surface 846. The touch surface 846 and touch-surface controller 842 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of the speaker 828 and/or the microphone 830.

In one implementation, a pressing of the button for a first duration may disengage a lock of the touch surface 846; and a pressing of the button for a second duration that is longer than the first duration may turn power to the computing device 800 on or off. Pressing the button for a third duration may activate a voice control, or voice command, module that enables the user to speak commands into the microphone 830 to cause the device to execute the spoken command. The user may customize a functionality of one or more of the buttons. The touch surface 846 can, for example, also be used to implement virtual or soft buttons and/or a keyboard.

In some implementations, the computing device 800 may present recorded audio and/or video files, such as MP3, AAC, and MPEG files. In some implementations, the computing device 800 may include the functionality of an MP3 player, such as an iPod™. The computing device 800 may, therefore, include a 36-pin connector and/or 8-pin connector that is compatible with the iPod. Other input/output and control devices may also be used.

The memory interface 802 may be coupled to memory 850. The memory 850 may include high-speed random access memory and/or non-volatile memory, such as one or more magnetic disk storage devices, one or more optical storage devices, and/or flash memory (e.g., NAND, NOR). The memory 850 may store an operating system 852, such as Darwin, RTXC, LINUX, UNIX, OS X, WINDOWS, or an embedded operating system such as VxWorks.

The operating system 852 may include instructions for handling basic system services and for performing hardware dependent tasks. In some implementations, the operating system 852 may be a kernel (e.g., UNIX kernel). In some implementations, the operating system 852 may include instructions for performing voice authentication.

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 may store addressing instructions 872 to facilitate other processes and functions, such as the location determination and display processes and functions as described with reference to FIGS. 1A-7.

The memory 850 may also store other software instructions 874, such as web video instructions to facilitate web video-related processes and functions; and/or web shopping instructions to facilitate web shopping-related processes and functions. In some implementations, the media processing instructions 866 may be divided into audio processing instructions and video processing instructions to facilitate audio processing-related processes and functions and video processing-related processes and functions, respectively.

Each of the above identified instructions and applications may correspond to a set of instructions for performing one or more functions described above. These instructions need not be implemented as separate software programs, procedures, or modules. The memory 850 may include additional instructions or fewer instructions. Furthermore, various functions of the computing device 800 may be implemented in hardware and/or in software, including in one or more signal processing and/or application specific integrated circuits.

Figure 9:
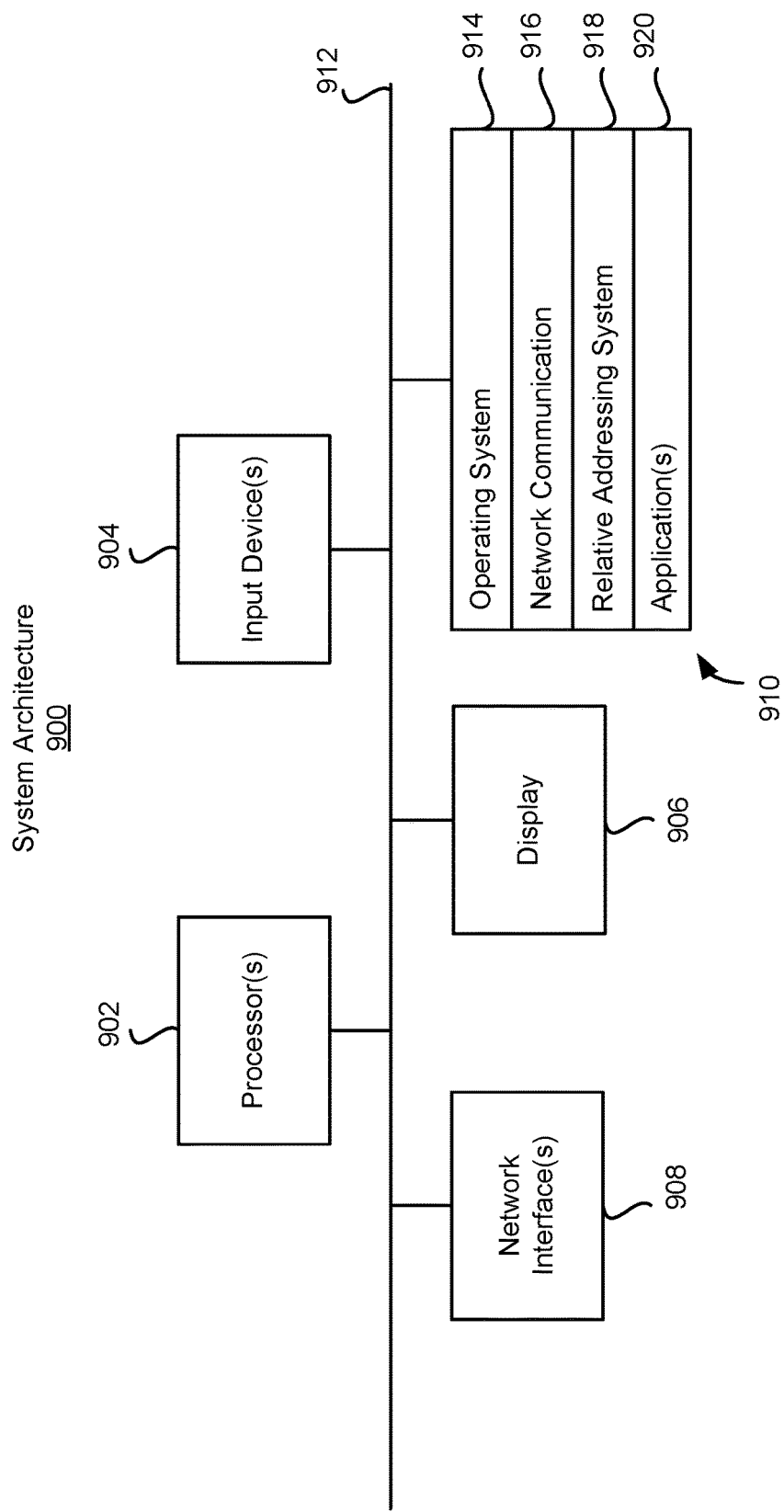
FIG. 9 is an example server configured for determining relevant location information.

FIG. 9 is a block diagram of an example system architecture 900 that may implement the features and processes of FIGS. 1A-7. In some embodiments, computing device 800 may cooperate with system architecture 900 to perform relative addressing. For example, device 800 may send a request for relative addressing information including device 800 location information and target location information. System architecture 900 may receive the request, determine relevant information and/or apply a template, and return the relevant information to device 800.

The architecture 900 may be implemented on any electronic device that runs software applications derived from compiled instructions, including without limitation personal computers, servers, smart phones, media players, electronic tablets, game consoles, email devices, etc. In some implementations, the architecture 900 may include one or more processors 902, one or more input devices 904, one or more display devices 906, one or more network interfaces 908, and one or more computer-readable mediums 910. Each of these components may be coupled by bus 912.

Display device 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device 904 may be any known input device technology, including but not limited to a keyboard (including a virtual keyboard), mouse, track ball, and touch-sensitive pad or display. Bus 912 may be any known internal or external bus technology, including but not limited to ISA, EISA, PCI, PCI Express, NuBus, USB, Serial ATA or FireWire. Computer-readable medium 910 may be any medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium 910 may include various instructions 914 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 may establish and maintain network connections (e.g., software for implementing communication protocols, such as TCP/IP, HTTP, Ethernet, etc.).

A relative addressing system 918 can include instructions that may generate and provide server instances that use or implement the processes described in reference to FIGS. 1A-7. For example, the relative addressing system 918 may perform relative addressing processing in response to device 800 requests as described above.

Application(s) 920 may be an application that uses or implements the processes described in reference to FIGS. 1A-7. The processes may also be implemented in operating system 914.

The described features may be implemented advantageously in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a computing device comprising a processor and a display screen, the method comprising:
   receiving, with a processor, a request to display descriptive information for a location of interest on a device;
   retrieving, with the processor, a first set of attributes for the location of interest, the first set of attributes describing an address for the location of interest;
   comparing, with the processor, the retrieved first set of attributes to a second set of attributes describing an address for a location associated with the device;
   identifying at least one common attribute that is common to the first set of attributes and the second set of attributes;
   generating a location description for the location of interest, including generating a reduced set of attributes that excludes the at least one common attribute and thereby comprises attributes that are different from the attributes in the second set of attributes; and
   displaying, on the display screen, the location description comprising the reduced set of attributes for the location of interest.

2. The method of claim 1, wherein the reduced set of attributes is displayed on a map being displayed by the device.

3. The method of claim 2, further comprising displaying an icon indicating the position of the location of interest on the map.

4. The method of claim 1, wherein the location associated with the device comprises a location of the first device, an area being displayed on a map by the device, or a location based on a user input to the device.

5. The method of claim 1, wherein the location of interest comprises the subject of a user query.

6. The method of claim 1, wherein the location of interest comprises a geographically or politically contiguous area being displayed.

7. The method of claim 1, wherein the first set of attributes comprises a set of generic identifiers related to each respective element of a location description for the location of interest.

8. The method of claim 7, wherein the location description comprises an address, a geographic area description, a political area description, or a combination thereof.

9. The method of claim 7, wherein the generic identifiers are language-independent.

10. The method of claim 1, wherein the first set of attributes comprises information defining a geographic or political area in which the location of interest is contained.

11. The method of claim 1, wherein reducing the first set of attributes comprises:
   identifying the attributes in the first set of attributes that do not match the attributes in the second set of attributes; and
   applying a template to the attributes in the first set of attributes that do not match the attributes in the second set of attributes to select at least one relevant attribute;
   wherein the at least one relevant attribute is used as the reduced set of attributes.

12. The method of claim 11, wherein the template defines most relevant attributes according to a naming convention associated with a geographic or political area in which the location of interest is contained.

13. The method of claim 11, wherein the template defines most relevant attributes according to a naming convention associated with an application running on the device and displaying the map.

14. The method of claim 1, wherein the reduced set of attributes further comprises a single attribute common to both the first set of attributes and the second set of attributes.

15. A device comprising:
   a display; and
   a processor coupled to the display and configured to:
   receiving, with a processor, a request to display descriptive information for a location of interest on a device;
   retrieving, with the processor, a first set of attributes for the location of interest, the first set of attributes describing an address for the location of interest;
   comparing, with the processor, the retrieved first set of attributes to a second set of attributes describing an address for a location associated with the device;
   identifying at least one common attribute that is common to the first set of attributes and the second set of attributes;
   generating a location description for the location of interest, including generating a reduced set of attributes that excludes the at least one common attribute and thereby comprises attributes that are different from the attributes in the second set of attributes; and
   displaying, on the display screen, the location description comprising the reduced set of attributes for the location of interest.

16. The device of claim 15, wherein the reduced set of attributes is displayed on a map being displayed on the display.

17. The device of claim 16, wherein the display is further configured to display an icon indicating the position of the location of interest on the map.

18. The device of claim 15, wherein the location associated with the device comprises a location of the first device, an area being displayed on a map by the device, or a location based on a user input to the device.

19. The device of claim 15, wherein the location of interest comprises the subject of a user query.

20. The device of claim 15, wherein the location of interest comprises a geographically or politically contiguous area being displayed.

21. The device of claim 15, wherein the first set of attributes comprises a set of generic identifiers related to each respective element of a location description for the location of interest.

22. The device of claim 21, wherein the location description comprises an address, a geographic area description, a political area description, or a combination thereof.

23. The device of claim 21, wherein the generic identifiers are language-independent.

24. The device of claim 15, wherein the first set of attributes comprises information defining a geographic or political area in which the location of interest is contained.

25. The device of claim 15, wherein the processor reduces the first set of attributes by:
   identifying the attributes in the first set of attributes that do not match the attributes in the second set of attributes; and
   applying a template to the attributes in the first set of attributes that do not match the attributes in the second set of attributes to select at least one relevant attribute;
   wherein the at least one relevant attribute is used as the reduced set of attributes.

26. The device of claim 25, wherein the template defines most relevant attributes according to a naming convention associated with a geographic or political area in which the location of interest is contained.

27. The device of claim 25, wherein the template defines most relevant attributes according to a naming convention associated with an application running on the device and displaying the map.

28. The device of claim 15, wherein the reduced set of attributes further comprises a single attribute common to both the first set of attributes and the second set of attributes.

29. A system comprising:
   a processor configured to:
   receiving, with a processor, a request to display descriptive information for a location of interest on a device;
   retrieving, with the processor, a first set of attributes for the location of interest, the first set of attributes describing an address for the location of interest;
   comparing, with the processor, the retrieved first set of attributes to a second set of attributes describing an address for a location associated with the device;
   identifying at least one common attribute that is common to the first set of attributes and the second set of attributes;
   generating a location description for the location of interest, including generating a reduced set of attributes that excludes the at least one common attribute and thereby comprises attributes that are different from the attributes in the second set of attributes; and
   displaying, on the display screen, the location description comprising the reduced set of attributes for the location of interest.

30. The system of claim 29, wherein the location of interest comprises the subject of a user query.

31. The system of claim 29, wherein the location of interest comprises a geographically or politically contiguous area being displayed.

32. The system of claim 29, wherein the first set of attributes comprises a set of generic identifiers related to each respective element of a location description for the location of interest.

33. The system of claim 32, wherein the location description comprises an address, a geographic area description, a political area description, or a combination thereof.

34. The system of claim 32, wherein the generic identifiers are language-independent.

35. The system of claim 29, wherein the first set of attributes comprises information defining a geographic or political area in which the location of interest is contained.

36. The system of claim 29, wherein the location associated with the device comprises a location of the first device, an area being displayed on a map by the device, or a location based on a user input to the device.

37. The system of claim 29, wherein the processor reduces the first set of attributes by:
    identifying the attributes in the first set of attributes that do not match the attributes in the second set of attributes; and
    applying a template to the attributes in the first set of attributes that do not match the attributes in the second set of attributes to select at least one relevant attribute;
    wherein the at least one relevant attribute is used as the reduced set of attributes.

38. The system of claim 37, wherein the template defines most relevant attributes according to a naming convention associated with a geographic or political area in which the location of interest is contained.

39. The system of claim 37, wherein the template defines most relevant attributes according to a naming convention associated with an application running on the device and displaying the reduced set of attributes.

40. The system of claim 29, wherein:
    the processor is in communication with the device through a network connection;
    the request is received through the network connection; and
    the processor causes the reduced set of attributes to be displayed by the device by sending the reduced set of attributed to the device through the network connection.

41. The system of claim 29, wherein the reduced set of attributes further comprises a single attribute common to both the first set of attributes and the second set of attributes.

* * * * *